United States Patent
Cai et al.

(10) Patent No.: US 11,679,374 B2
(45) Date of Patent: *Jun. 20, 2023

(54) CORE-SHELL STRUCTURE POLYMER MAGNETIC NANOSPHERES WITH HIGH CR (VI) ADSORPTION CAPACITY, PREPARATION METHOD AND APPLICATION

(71) Applicant: Guangzhou University, Guangzhou (CN)

(72) Inventors: Weiquan Cai, Guangzhou (CN); Yihong Jiang, Guangzhou (CN)

(73) Assignee: GUANGZHOU UNIVERSITY, Guangzhou (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/720,698

(22) Filed: Apr. 14, 2022

(65) Prior Publication Data

US 2022/0234026 A1 Jul. 28, 2022

Related U.S. Application Data

(63) Continuation of application No. 17/472,616, filed on Sep. 11, 2021.

(30) Foreign Application Priority Data

Jan. 22, 2021 (CN) .......................... 202110085727.4

(51) Int. Cl.
*B01J 20/24* (2006.01)
*B01J 20/06* (2006.01)
*B01J 20/26* (2006.01)
*B01J 20/28* (2006.01)
*B01J 20/32* (2006.01)

(52) U.S. Cl.
CPC .............. *B01J 20/24* (2013.01); *B01J 20/06* (2013.01); *B01J 20/262* (2013.01); *B01J 20/28009* (2013.01); *B01J 20/28021* (2013.01); *B01J 20/3204* (2013.01); *B01J 20/3223* (2013.01); *B01J 20/3289* (2013.01); *B01J 20/3293* (2013.01)

(58) Field of Classification Search
CPC . B01J 20/24; B01J 20/06; B01J 20/262; B01J 20/28009; B01J 20/28021; B01J 20/3204; B01J 20/3223; B01J 20/3289; B01J 20/3293
USPC ...................................................... 252/62.54
See application file for complete search history.

(56) References Cited

U.S. PATENT DOCUMENTS

2020/0263025 A1* 8/2020 Li ........................... C08L 51/10
2021/0245137 A1* 8/2021 Myung .............. B01J 20/28011

* cited by examiner

*Primary Examiner* — Edward M Johnson
(74) *Attorney, Agent, or Firm* — Getech Law LLC; Jun Ye

(57) ABSTRACT

A method for preparing a core-shell structure polymer magnetic nanosphere with a high Cr (VI) adsorption capacity includes: adding Fe3O4 powder into a mixed solution of water and ethanol, dispersing Fe3O4 powder in the solution evenly by ultrasound, sequentially adding resorcinol and formaldehyde into the suspension to adjust a pH, stirring and reacting to obtain Fe3O4@RF evenly dispersed in a chitosan solution, dropwise adding the prepared suspension into a mixed solution of paraffin and span 80, stirring for a period of time, adding a glutaraldehyde aqueous solution, stirring and reacting to obtain a magnetic chitosan nanosphere. The magnetic chitosan nanosphere prepared may be applied to adsorbing Cr (VI) in a water solution. Not only the magnetic chitosan nanospheres prepared has a high adsorption capacity for Cr (VI), but also can be quickly separated by an external magnetic field after adsorption.

8 Claims, 5 Drawing Sheets

CORE-SHELL STRUCTURE POLYMER MAGNETIC NANOSPHERES WITH HIGH CR (VI) ADSORPTION CAPACITY, PREPARATION METHOD AND APPLICATION

CROSS-REFERENCE TO RELATED APPLICATION

This application is a continuation of U.S. patent application Ser. No. 17/472,616, filed Sep. 11, 2021, the content of which application is hereby expressly incorporated herein by reference in its entirety.

TECHNICAL FIELD

The disclosure relates to a field of heavy metal ion adsorption material technologies, and particularly to a core-shell structure polymer magnetic nanospheres with a high Cr (VI) adsorption capacity, its preparation method and application.

BACKGROUND ART

Chromium is a common toxic heavy metal ion in industrial wastewater, typically in two oxidation states, that is, trivalent chromium (Cr (III)) and hexavalent chromium (Cr (VI)). The toxicity of Cr (VI) is much higher than the toxicity of Cr (III), and Cr (VI) usually exists in the form of $HCrO_4^-$ and $CrO_4^{2-}$ in acidic wastewater. Common methods for removing heavy metal ions include precipitation, biodegradation, adsorption, ion exchange, membrane separation, etc. Compared with other processing methods, the adsorption method is simple and efficient, wide in applications, etc. Chitosan is rich in amino groups and hydroxyl groups on its surface, and thus it is often used for adsorbing heavy metals and dyes. It is a commonly used biomass adsorbent at present. Common methods for preparing a chitosan adsorbent include a solvothermal method, a precipitation method and a coating method, etc.

Chinese patent literature CN110052249A discloses a process for treating chromium-containing wastewater by chitosan-coated fly ash. The method utilizes chitosan-coated fly ash to adsorb heavy metal Cr (VI). First, perform high temperature activation for fly ash, then perform acid leaching for the activated fly ash and dry to obtain acidic fly ash; add the acidic fly ash into a chitosan acetic acid solution, then add a NaOH solution until the solution is flocculated; filter, wash, and dry at 100° C. to obtain the chitosan coated fly ash; the fly ash equilibrates the adsorption of Cr(VI) at 25° C. within 90 min, with the optimal adsorption pH of 5 and the maximum adsorption capacity of 0.35 mg/kg. Chinese patent literature CN103933951A prepared a novel acid-resistant carbon material which is rich in hydroxyl groups and amino groups using chitosan as a raw material by hydrothermal reaction. The carbon material may be stable in a wide pH range, and may not be dissolved in an acidic solution. It shows a good adsorption performance and a cyclic regeneration adsorption performance for Cr (VI). The adsorption removal efficiency of the Cr (VI) solution with a concentration of 100 mg/L and pH=2 is 90%, and the maximum adsorption capacity is up to 343 mg/g. However, the chitosan adsorbent prepared by the method is often poor in distribution of adsorption activity.

SUMMARY

In order to solve shortcomings of the related art, the primary purpose of the disclosure is to provide a method for preparing a core-shell structure polymer magnetic nanosphere with a high adsorption capacity for Cr (VI). The method includes following steps: performing sol-gel polymerization on resorcinol and formaldehyde, coating a layer of phenolic resin on the surface of the magnetic core to form a phenolic resin-coated magnetic nanosphere; and finally preparing a chitosan-coated magnetic core nanosphere through an inverse suspension crosslinking method to obtain a regular-coated magnetic polymer core-shell material with good adsorption performance, cyclic adsorption performance and easy separation characteristic for Cr (VI). A layer-by-layer coating method is adopted in the disclosure to obtain a magnetic chitosan material with a single-core double-layer shell structure. The chitosan is concentrated on the outer surface of the material, so that the adsorption active groups are distributed on the outer layer. Therefore, this way effectively solves uneven distribution in the preparation process of the hydrothermal method and the precipitation method.

Another purpose of the disclosure is to provide a core-shell structure polymer magnetic nanosphere with a high Cr (VI) adsorption capacity prepared by the above method.

Another purpose of the disclosure is to provide an application of the core-shell structure polymer magnetic nanosphere with above high Cr (VI) adsorption capacity.

The purpose of the disclosure may be implemented by the following technical scheme:

A method for preparing a core-shell structure polymer magnetic nanosphere with a high Cr(VI) adsorption capacity includes the following blocks:

(1) Preparation of $Fe_3O_4@RF$ adding $Fe_3O_4$ powder into a mixed solution of water and ethanol, dispersing $Fe_3O_4$ powder in the solution evenly by ultrasound, sequentially adding resorcinol and formaldehyde into the suspension to adjust a pH, and finally stirring the mixed suspension for a period of time; washing and drying after magnetic separation to obtain a formaldehyde-coated ferroferric oxide nanosphere ($Fe_3O_4@RF$).

(2) Preparation of FRC dispersing $Fe_3O_4@RF$ in a chitosan (CS) solution evenly, dropwise adding the prepared suspension into a mixed solution of paraffin and span 80, stirring for a period of time, adding a glutaraldehyde aqueous solution, stirring and reacting, and finally centrifuging, washing and drying the obtained mixed suspension to obtain a magnetic chitosan nanosphere (FRC), that is, the core-shell structure polymer magnetic nanosphere with a high Cr (VI) adsorption capacity.

Preferably, at block(1), the $Fe_3O_4$ powder is prepared by: dissolving 2.7 parts by mass (each part by mass is 1 g) of $FeCl_3.6H_2O$ in 80 parts by volume (each part by volume is 1 mL) of ethylene glycol at room temperature, adding 7.2 parts by mass of NaAc after stirring until clear and transparent, and continuing stirring until the solid is completely dissolved; then moving the mixed solution into a reactor, and performing hydrothermal reaction at 200° C. for 16 h; washing the black precipitate with ethanol after cooling to room temperature, separating and drying to obtain the $Fe_3O_4$ powder.

Preferably, at block(1), the addition amount of the $Fe_3O_4$ powder is 0.5 parts by mass, the addition amount of resorcinol is 0.4 parts by mass, and the addition amount of formaldehyde is 0.8 parts by mass.

Preferably, at block(1), the pH value is adjusted to 9' by ammonia.

Preferably, at block(1), stir the mixed suspension at 30° C. for 10 h.

Preferably, at block(1), the washing refers to washing with deionized water and ethanol correspondingly several times; the drying refers to vacuum drying at 60° C. for 12 h Preferably, at block(1), the ultrasonic time is 10~15 min; the volume ratio of water to ethanol in the mixed solution of water and ethanol being 1:2.

Preferably, at block(2), the mass ratio of $Fe_3O_4$@R to chitosan is 1:1~5.

Preferably, at block (2), in the mixed solution of paraffin and span 80, the volume ratio of paraffin to span 80 is 75:5.

Preferably, at block(2), the chitosan solution is 50.55 parts by volume, the glutaraldehyde aqueous solution is 10 parts by volume, the mixed solution of paraffin and span 80 is 80 parts by volume, the mass concentration of the chitosan solution is 1%-5%, and the volume concentration of the glutaraldehyde aqueous solution is 5%-15%.

Preferably, at block(2), stir for 1 h after dropwise adding the suspension to the mixed solution of paraffin and span 80; stir for 0.5-2 h after adding the glutaraldehyde aqueous solution.

Preferably, at block(2), the washing refers to washing with isopropanol until the filtrate is clear; the drying refers to vacuum drying at 60° C. for 12 h.

In the disclosure, a magnetic core-shell nanosphere is mainly prepared by a layer-by-layer coating method, and chitosan is coated on the outer layer of the magnetic core for modification by an inverse suspension method to prepare a core-shell structure polymer magnetic nanosphere with a high adsorption capacity, with low preparation conditions in requirements on a reacting equipment, simple blocks and good morphology of the prepared nanosphere. The inner magnetic core of the core-shell structure magnetic chitosan material may be configured for rapid separation; the middle-layer phenolic resin may serve as a protective layer of the ferroferric oxide magnetic core to protect the magnetic core from acid and alkali erosion; the outer-layer chitosan is rich in amino groups and hydroxyl groups that are the main active groups in the adsorption process.

The core-shell structure polymer magnetic nanosphere with a high Cr (VI) adsorption capacity may be applied to adsorbing Cr (VI) in a water solution. Not only the core-shell material prepared has a high adsorption capacity for Cr (VI), but also may be quickly separated by an external magnetic field after adsorption, with advantages of distinct layers of structure, rapid separation and performance regulated through morphology. In addition, a regular core-shell structure makes it easier to be modified, and thus it has potential application values in the fields of catalysis, adsorption and medicine.

Preferably, the adsorbent is configured for adsorbing a Cr(VI) solution with a pH of 2 and a concentration of 25~500 mg/L. When the concentration of Cr (VI) is 100 mg/L, the adsorption capacity for Cr (VI) is up to 99.99 mg/L, the removal efficiency is 99.99%, and the residual concentration is 0.01 mg/L; when the concentration of chromium is 500 mg/L, the adsorption capacity for Cr (VI) may be up to 249.1 mg/g.

The magnetic chitosan adsorbent after adsorption of Cr(VI) is desorbed with a 0.005 mol/L NaOH solution, the magnetic chitosan adsorbent after desorption of Cr(VI) is recycled for use, and the adsorption capacity after 4 cycles still has 90% of the original adsorption capacity.

The basic reaction principle of the disclosure is that resorcinol and formaldehyde are hydrolyzed in a mixed solution of water and ethanol to generate phenolic resin, and ethanol may be added in advance to slow down, and control the synthesis rate of phenolic resin. The magnetic core is dispersed in the chitosan solution evenly in advance, which facilitates a stronger interaction with the chitosan coating process. In the adsorption process of Cr(VI) by the prepared absorbent, rich amino groups on the chitosan are protonated in an acidic aqueous solution to form $—NH_3^+$ with positive charges, and $—NH_3^+$ interacts with $Cr_2O_7^{2-}$ or $CrO_4^{2-}$ in the form of an anion by electrostatic interaction.

Compared with the related art, the present disclosure has the following advantages and beneficial effects:

(1) The magnetic core surface coated with phenolic resin may reduce agglomeration of magnetic cores, avoid oxidation, and increase the specific surface area of the magnetic core, thereby facilitating further coating, improving acid and alkali resistance of the magnetic core and increasing the service life of the adsorbent.

(2) The chitosan has a gel network structure after cross-linked, and the swelling property of the gel facilitates heavy metal wastewater to enter the gel network structure and combine with the active group.

(3) The prepared magnetic adsorbent has a magnetic separation function on the basis of not reducing the self-adsorption performance of the chitosan.

(4) The magnetic composite adsorbent prepared has a higher adsorption capacity and removal efficiency for Cr (VI), with the maximum adsorption capacity of 500 mg/L Cr (VI) solution up to 249.1 mg/g and the adsorption removal efficiency of 100 mg/L Cr (VI) solution up to 99.9%, and is easily separated from water after adsorption, which saves separation cost.

(6) The prepared magnetic composite adsorbent is excellent in cyclic adsorption performance, and the adsorption capacity after 4 cyclic adsorptions may still be up to 90% of the original adsorption capacity.

DETAILED DESCRIPTION

The present disclosure is further described in detail below in combination with embodiments and drawings, however, implementations of the disclosure are not limited here. The raw materials involved in the present disclosure may be purchased directly from the market. Process parameters not specifically noted may refer to conventional techniques.

Embodiment 1

Dissolve 2.7 g $FeCl_3.6H_2O$ in 80 mL ethylene glycol at room temperature, add 7.2 g NaAc after magnetic stirring until the solution is clear and transparent, and continue stirring until the solid is completely dissolved. Place the mixed solution into a 100 mL reactor lining polytetrafluoroethylene, and store at constant temperature in a 200V oven for 16 h. Cool the mixed solution to room temperature, discard the supernatant, wash the black precipitate with ethanol several times until the liquid is clear, separate by a permanent magnet and dry at 60° C. for 12 h to obtain the $Fe_3O_4$ powder.

Add 0.5 g $Fe_3O_4$ to 20 mL deionized water and 40 mL ethanol, and disperse $Fe_3O_4$ in the solution evenly by ultrasound for 10 min. Sequentially add 0.4 g resorcinol and 0.8 g formaldehyde to the suspension, adjust the pH of the suspension to 9 with ammonia, and finally stir the suspension at 30° C. for 10 h. After magnetic separation, wash with deionized water and ethanol three times, and vacuum dry a filter cake at 60° C. for 12 h to obtain $Fe_3O_4$@ RF nanospheres.

Dissolve 0.5 g chitosan in a mixed solution of 50 mL deionized water and 0.4 mL acetic acid to prepare an acetic acid solution with a 1 wt % chitosan concentration. Add 0.5 g $Fe_3O_4$@RF to the prepared solution at a mass ratio of $Fe_3O_4$@RF:Cs=1:1, and stir until $Fe_3O_4$@RF is evenly dispersed in the solution. Dropwise add the prepared suspension to a mixed solution of 75 mL paraffin and 5 mL span 80, stir for 1 h, add 10 mL, 15% (volume concentration) glutaraldehyde aqueous solution and stir for 0.5 h. Finally, centrifuge the prepared mixed suspension, wash the filter cake with isopropanol until the filtrate is clear, and vacuum dry the obtained solid at 60° C. for 12 h to obtain RC nanospheres.

Figure 1:
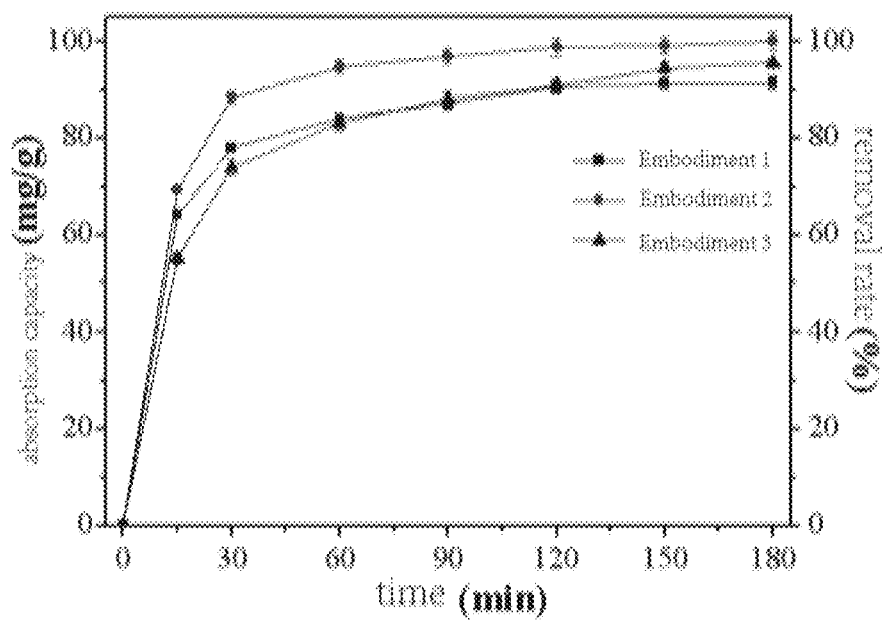
FIG. 1 is a Cr (VI) adsorption kinetic curve corresponding to FRC nanosphere samples prepared in Embodiments 1 to 3.

When the magnetic chitosan prepared by the above method adsorbs 100 mL Cr(VI) solution of 100 mg/L, adjust the pH to 2 with a hydrochloric acid solution of a 1 mol/L concentration, and then add 0.1 g FRC nanospheres prepared above, and set parameters of a constant-temperature oscillation box to 25V, 180 r/min. The adsorption kinetic curve of the magnetic composite adsorbent for Cr (VI) refers to FIG. 1. The adsorption removal efficiency for Cr (VI) is 91.3%, and the adsorption capacity is 91.3 mg/g.

Embodiment 2

Dissolve 2.7 g $FeCl_3.6H_2O$ in 80 mL ethylene glycol at room temperature, add 7.2 g NaAc after magnetic stirring until the solution is clear and transparent, and continue stirring until the solid is completely dissolved. Place the mixed solution into a 100 mL reactor lining polytetrafluoroethylene, and store at constant temperature in a 200V oven for 16 h. Cool the mixed solution to room temperature, discard the supernatant, wash the black precipitate with ethanol several times until the liquid is clear, separate by a permanent magnet and dry at 60° C. for 12 h to obtain the $Fe_3O_4$ powder.

Add 0.5 g $Fe_3O_4$ to 20 mL deionized water and 40 mL ethanol, and disperse $Fe_3O_4$ in the solution evenly by ultrasound for 13 min. Sequentially add 0.4 g resorcinol and 0.8 g formaldehyde to the suspension, adjust the pH of the suspension to 10 with ammonia, and finally stir the mixed suspension at 30° C. for 10 h. After magnetic separation, wash with deionized water and ethanol 3 times, and vacuum dry at 60° C. for 12 h to obtain $Fe_3O_4$@RF nanospheres.

Dissolve 1.5 g chitosan in a mixed solution of 50 mL deionized water and 0.4 mL acetic acid to prepare an acetic acid solution with a 3 wt % chitosan concentration. Add 0.5 g $Fe_3O_4$@RF to the prepared solution at a mass ratio of $Fe_3O_4$@RF:Cs=1:3, and stir until $Fe_3O_4$@RF is evenly dispersed in the solution. Dropwise add the prepared suspension to a mixed solution of 75 mL paraffin and 5 mL span 80 and stir for 1 h, and then add 10 mL 10% (volume concentration) glutaraldehyde aqueous solution and stir for 1 h. Finally, centrifuge the prepared mixed suspension, wash with isopropanol until the filtrate is clear, and vacuum dry the obtained solid at 60° C. for 12 h to obtain FRC nanospheres.

When the magnetic chitosan prepared by the above method adsorbs 100 mL Cr(VI) solution of 100 mg/L, adjust the pH to 2 with a hydrochloric acid solution of a 1 mol/L concentration, and then add 0.1 g FRC nanosphere prepared above, and set parameters of a constant-temperature oscillation box to 25V, 180 r/min. The adsorption kinetic curve of the magnetic composite adsorbent for Cr (VI) refers to FIG. 1. The adsorption removal efficiency for Cr (VI) is 99.9%, and the adsorption capacity is 99.9 mg/g.

Embodiment 3

Dissolve 2.7 g $FeCl_3.6H_2O$ in 80 mL ethylene glycol at room temperature, add 7.2 g NaAc after magnetic stirring until the solution is clear and transparent, and continue stirring until the solid is completely dissolved. Place the mixed solution into a 100 mL reactor lining polytetrafluoroethylene, and store at constant temperature in a 200V oven for 16 h. Cool the mixed solution to room temperature, discard the supernatant, wash the black precipitate with ethanol several times until the liquid is clear, separate by a permanent magnet and vacuum dry a filter cake at 60° C. for 12 h to obtain the $Fe_3O_4$ powder.

Add 0.5 g $Fe_3O_4$ to 20 mL deionized water and 40 mL ethanol, and disperse $Fe_3O_4$ in the solution evenly by ultrasound for 15 min. Sequentially add 0.4 g resorcinol and 0.8 g formaldehyde to the suspension, adjust the pH to 11 with ammonia, and finally stir the mixed suspension at 30° C. for 10 h. After magnetic separation, wash with deionized water and ethanol 3 times, and vacuum dry a filter cake at 60° C. for 12 h to obtain $Fe_3O_4$@RF nanospheres.

Dissolve 2.5 g chitosan in a mixed solution of 50 mL deionized water and 0.4 mL acetic acid to prepare an acetic acid solution with a 5 wt % chitosan concentration. Add 0.5 g $Fe_3O_4$@RF to the prepared solution at a mass ratio of $Fe_3O_4$@RF:Cs=1:5, and stir until $Fe_3O_4$@RF is evenly dispersed in the solution. Dropwise add the prepared suspension to a mixed solution of 75 mL paraffin and 5 mL span 80 and stir for 1 h, and then add 10 mL 5% (volume concentration) glutaraldehyde aqueous solution and stir for 2 h. Finally, centrifuge the prepared mixed suspension, wash with isopropanol until the filtrate is clear, and vacuum dry the obtained filter cake at 60° C. for 12 h to obtain FRC nanospheres.

When the magnetic chitosan prepared by the above method adsorbs 100 mg/L Cr(VI) solution, adjust the pH to 2 with a hydrochloric acid solution of a 1 mol/L concentration, and then add 0.1 g FRC nanosphere prepared above, and set parameters of a constant-temperature oscillation box to 25V, 180 r/min. The adsorption kinetic curve of the magnetic composite adsorbent for Cr (VI) refers to FIG. 1. The adsorption removal efficiency for Cr (VI) is 95.6%, and the adsorption capacity is 95.6 mg/g.

Embodiment 4

Figure 2:
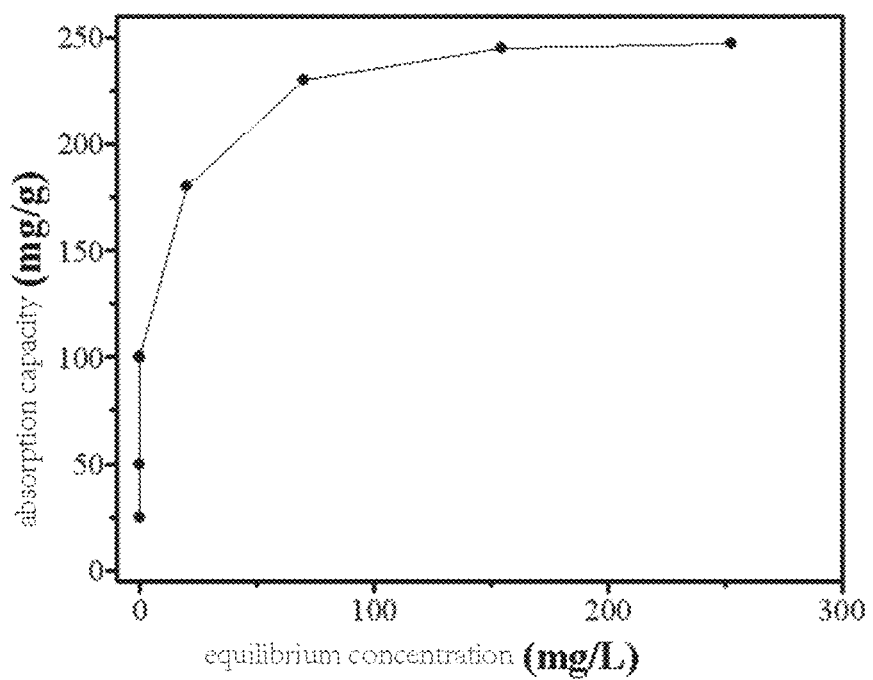
FIG. 2 is an adsorption isotherm of an FRC nanosphere sample prepared in Embodiment 2.

To observe the adsorption capacity of a magnetic chitosan adsorbent with a high adsorption capacity for different concentrations of Cr (VI) solutions, taking the adsorbent prepared in Embodiment 2 for an example, the adsorption performances of the absorbent in different initial concentrations of Cr (VI) solutions are tested. The adsorption process is as follow: configure 50 mL Cr(VI) solution of 25 mg/L at a pH=2, 50 mL Cr(VI) solution of 50 mg/L at a pH=2, 50 mL Cr(VI) solution of 100 mg/L at a pH=2, 50 mL Cr(VI) solution of 200 mg/L at a pH=2, 50 mL Cr(VI) solution of 300 mg/L at a pH=2, 50 mL Cr(VI) solution of 400 mg/L at a pH=2 and 50 mL Cr(VI) solution of 500 mg/L at a pH=2, add 0.05 g magnetic composite adsorbent in the above Cr(VI) solution correspondingly, and set parameters of the constant-temperature oscillation box to 25V, 180 r/min. The adsorption isotherm of the magnetic composite adsorbent prepared in Embodiment 2 refers to FIG. 2. The adsorption capacity is 249.1 mg/g.

Embodiment 5

Figure 3:
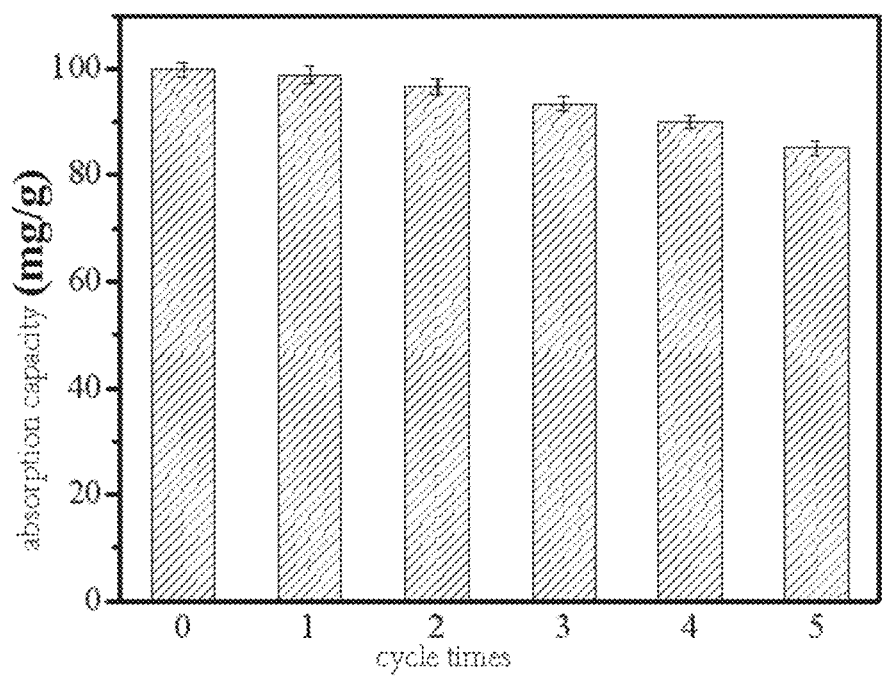
FIG. 3 is a cyclic adsorption diagram of an FRC nanosphere sample prepared in Embodiment 2.
Figure 4:
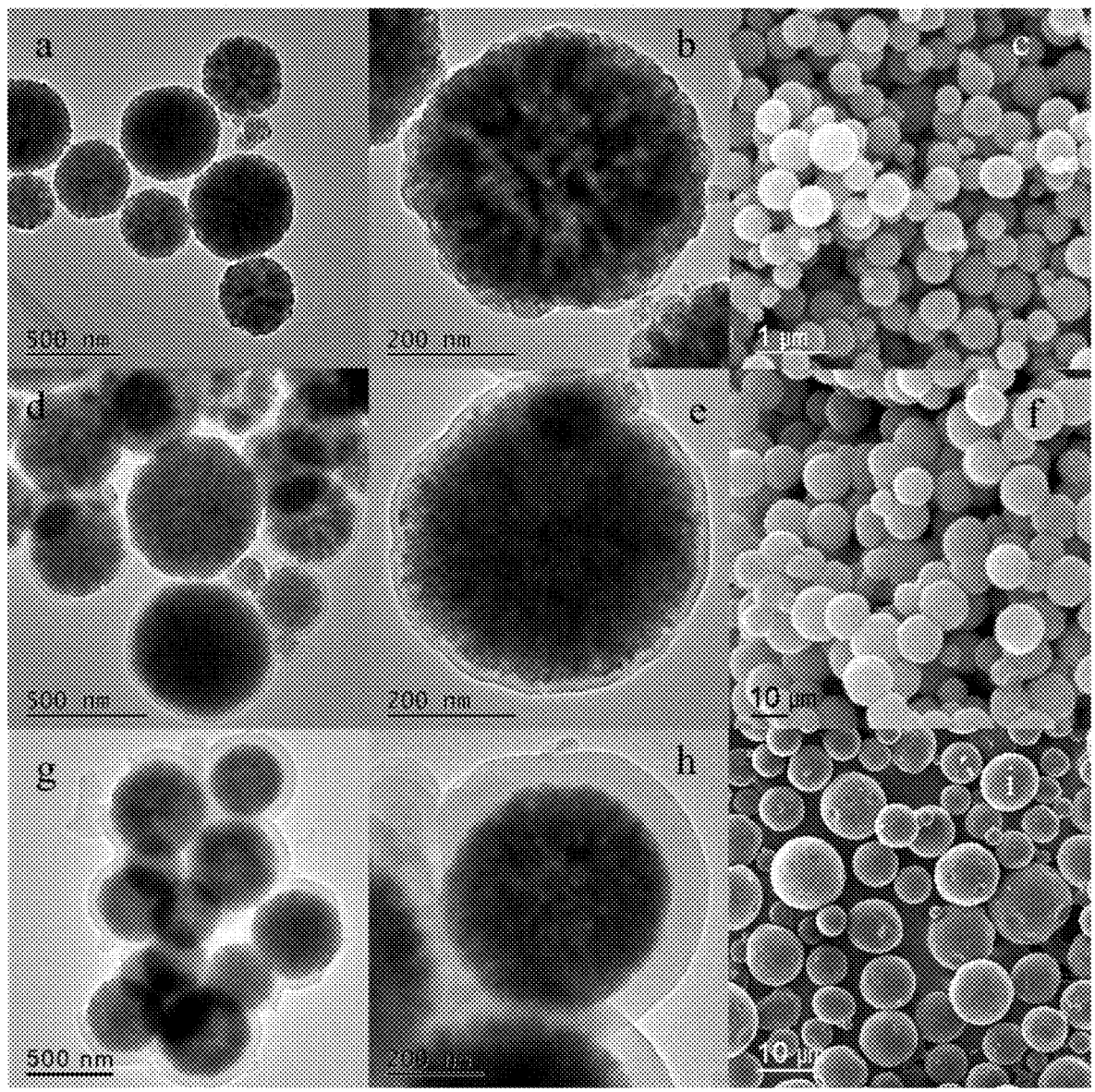
FIG. 4 are TEM and SEM photographs of $Fe_3O_4$, $Fe_3O_4$@RF and FRC nanosphere samples prepared in Embodiment 2: a, b are TEM photographs of $Fe_3O_4$, d, e are TEM photographs of F $Fe_3O_4$@RF, g, h are TEM photographs of an FRC nanosphere, c is an SEM photograph of $Fe_3O_4$@RF, f is an SEM photograph of $Fe_3O_4$@RF, and i is an SEM photograph of an FRC nanosphere.
Figure 5:
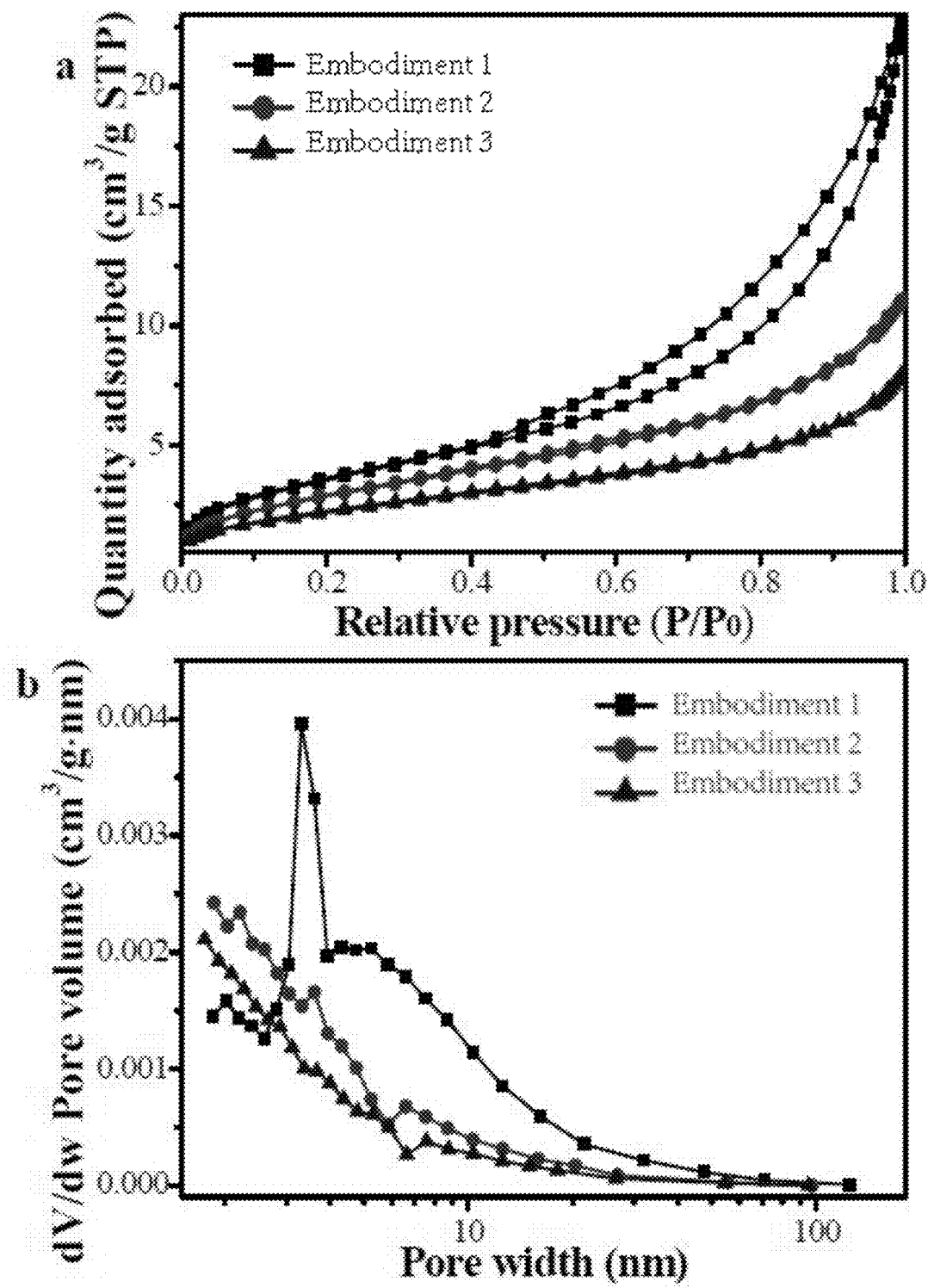
FIG. 5 are a nitrogen adsorption desorption curve (a) and a pore distribution curve (b) of an FRC nanosphere sample prepared in Embodiment 2.
Figure 6:
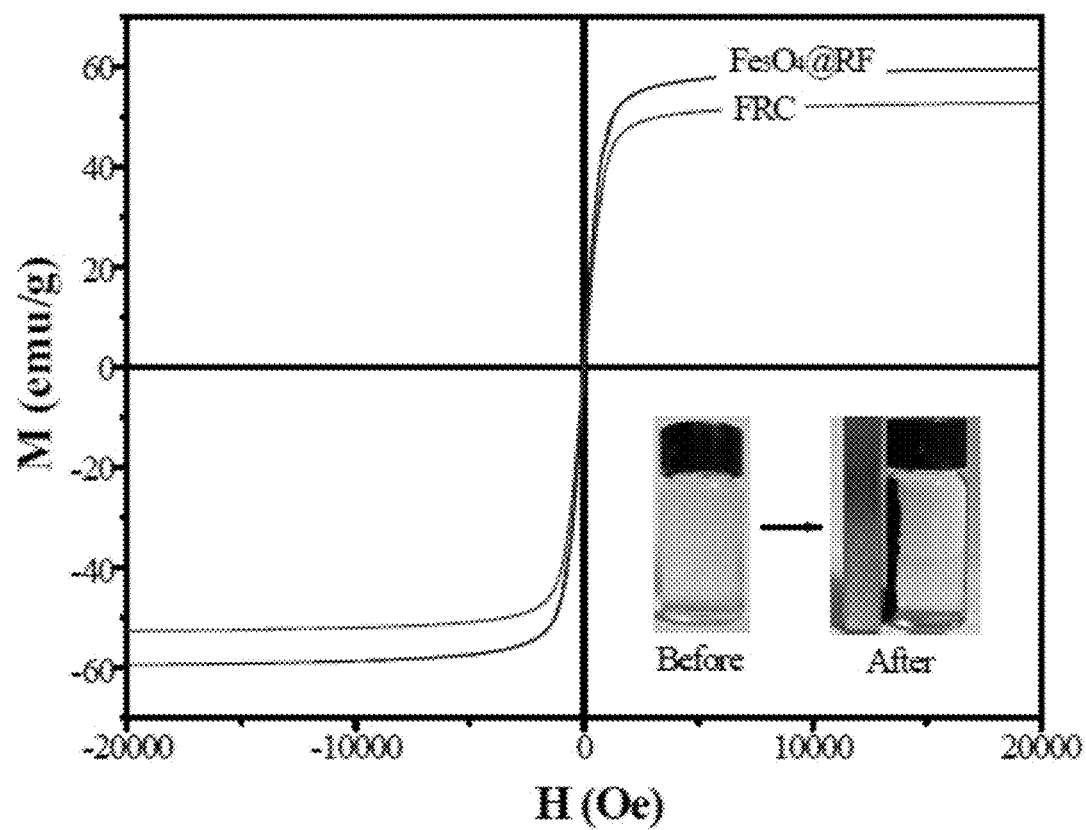
FIG. 6 is a hysteresis loop of an FRC nanosphere sample prepared in Embodiment 2, with a small photograph at the lower right corner of a sample separated by a magnet.

In order to observe the cyclic regeneration adsorption performance of a typical sample of the magnetic chitosan adsorbent with a high adsorption capacity, desorb the sample after adsorption equilibrium in Embodiment 2 with 0.005 mol/L NaOH solution for 12 h, then dry and recycle, and absorb a Cr(VI) solution of pH=2,100 mg/L for the desorbed sample again, and set the parameters of a constant-temperature oscillation box to 25° C., 180 r/min. Repeat the above adsorption-desorption process 5 times to determine the adsorption capacity of the magnetic composite adsorbent for Cr (VI). The cyclic adsorption result of the magnetic composite adsorbent refers to FIG. 3. The result shows that the adsorption capacity after 4 cycles remains 90% of the original adsorption capacity, and the cyclic regeneration adsorption performance is relatively stable.

The concentration of Cr (VI) in Embodiments 1-5 is determined by a diphenylcarbazide spectrophotometry, and the uv-vis spectrophotometer used is a UVMINI-1240 type of Shimadzu.

Table 1 illustrates a comparison of adsorption capacities of chitosan when adsorbing 100 mg/L Cr (VI) solution under the same conditions in Embodiments 1, 2, 3. Table 2 illustrates pore structure parameters of Embodiment 1, Embodiment 2, and Embodiment 3.

TABLE 1

| Absorbent | Adsorption Condition | Adsorption Capacity |
|---|---|---|
| Chitosan | 25° C., pH = 2 | 79.1 |
| Embodiment 1 | 25° C., pH = 2 | 91.3 |
| Embodiment 2 | 25° C., pH = 2 | 99.9 |
| Embodiment 3 | 25° C., pH = 2 | 95.6 |

TABLE 2

| Sample | Specific Surface Area $S_{BET}$ (mg2/g) | Pore Volume V1 (cm3/g) | Average Pore Size $D_{BJH}$ (mm) |
|---|---|---|---|
| Embodiment 1 | 13.18 | 0.035 | 8.46 |
| Embodiment 2 | 10.70 | 0.016 | 6.13 |
| Embodiment 3 | 8.10 | 0.011 | 5.78 |

The above embodiments are preferred embodiments of the present disclosure. However, implementations of the invention are not limited by the above embodiments, and any other changes, modifications, substitutions, combinations and simplifications not departing from the spirit and principles of the disclosure should be equivalent replacements and included in the protection scope of the present disclosure.

What is claimed:

1. A method for preparing a core-shell structure polymer magnetic nanosphere with a high Cr (VI) adsorption capacity, comprising:
   adding Fe3O4 powder into a mixed solution of water and ethanol, dispersing Fe3O4 powder in a solution evenly by ultrasound, sequentially adding resorcinol and formaldehyde into a suspension to adjust a pH, and finally stirring the suspension for a period of time; washing and drying after magnetic separation to obtain Fe3O4@RF;
   dispersing Fe3O4@RF in a chitosan solution evenly, dropwise adding the suspension into a mixed solution of paraffin and span 80, stirring for a period of time, adding a glutaraldehyde aqueous solution, stirring and reacting, and finally centrifuging, washing and drying the suspension to obtain the core-shell structure polymer magnetic nanosphere with a high Cr (VI) adsorption capacity.

2. The method of claim 1, wherein, at block(1), preparing the Fe3O4 powder by: dissolving 2.7 parts by mass of FeCl3.6H2O in 80 parts by volume of ethylene glycol at room temperature, adding 7.2 parts by mass of NaAc after stirring until clear and transparent, and continuing stirring until the NaAc is completely dissolved; then moving the mixed solution into a reactor, and performing hydrothermal reaction at 200 C° for 16 h; washing black precipitate with ethanol after cooling to room temperature, separating and drying to obtain the Fe3O4 powder.

3. The method of claim 1, wherein, at block(1), the addition amount of the Fe3O4 powder being 0.5 parts by mass, the addition amount of resorcinol being 0.4 parts by mass, and the addition amount of formaldehyde being 0.8 parts by mass.

4. The method of claim 1, wherein, at block(1), stirring the mixed suspension at 30 C° for 10 h.

5. The method of claim 1, wherein, at block(1), adjusting the pH value to 9~11; the ultrasonic time being 10~15 min; the volume ratio of water to ethanol in the mixed solution of water and ethanol being 1:2.

6. The method of claim 1, comprising: at block(2), the mass ratio of Fe3O4@R to chitosan being 1:1~5.

7. The method of claim 1, wherein, at block(2), the chitosan solution being 50~55 parts by volume, the glutaraldehyde aqueous solution being 10 parts by volume, the mixed solution of paraffin and span 80 being 80 parts by volume, the mass concentration of the chitosan solution being 1%~5%, and the volume concentration of the glutaraldehyde aqueous solution being 5%~15%.

8. The method of claim 1, wherein, at block(2), in the mixed solution of paraffin and span 80, the volume ratio of paraffin to span 80 being 75:5; stirring for 1 h after dropwise adding the suspension to the mixed solution of paraffin and span 80; stirring for 0.5~2 h after adding the glutaraldehyde aqueous solution.

* * * * *